United States Patent
Glenn (10) Patent No.: US 6,324,994 B1
(45) Date of Patent: Dec. 4, 2001

(54) HYBRID TRANSIT SYSTEM

(76) Inventor: Charles A. Glenn, 516 Little City Rd., Higganum, CT (US) 06441

(*) Notice: Subject to any disclaimer, the term of this patent is extended or adjusted under 35 U.S.C. 154(b) by 0 days.

(21) Appl. No.: 09/521,981

(22) Filed: Mar. 9, 2000

(51) Int. Cl.[7] .................................................. B61C 11/00
(52) U.S. Cl. ...................................... 105/72.2; 105/215.2
(58) Field of Search ............................... 105/72.2, 215.2; 104/130.09, 139, 140, 288, 28

(56) References Cited

U.S. PATENT DOCUMENTS

| | | |
|---|---|---|
| 2,150,348 | 3/1939 | Strauss . |
| 2,541,514 | 2/1951 | Herold . |
| 2,866,418 | 12/1958 | Petrick, Sr. . |
| 2,879,719 | 3/1959 | Gaebler . |
| 3,120,821 | 2/1964 | Bingham . |
| 3,225,704 | 12/1965 | Gilvar et al. . |
| 3,921,532 | 11/1975 | Nelson . |
| 4,843,973 | 7/1989 | Hartelius et al. . |
| 5,016,544 | 5/1991 | Woollam . |
| 5,611,282 | 3/1997 | Alt . |

*Primary Examiner*—S. Joseph Morano
*Assistant Examiner*—Lars A. Olson
(74) *Attorney, Agent, or Firm*—Alix, Yale & Ristas, LLP (57) ABSTRACT

A hybrid transit system comprising a transit corridor and a hybrid vehicle for carriage of people and goods within the corridor. The transit corridor includes railway sections, roadway sections and transit corridor junctions between the two sections. The railway sections include a pair of steel rails and a traction strip in a parallel arrangement. The roadway sections include paved roads. The hybrid vehicle is supported by a plurality of dual mode wheels and propelled by a traction wheel system. Each dual mode wheel is comprised of a flanged section for cooperation with the rails of the railway section and a rim section, including a tire, for cooperation with the paved roadway of the roadway section. A traction wheel system engages the traction strip or roadway surface to propel the hybrid vehicle.

21 Claims, 4 Drawing Sheets

HYBRID TRANSIT SYSTEM

BACKGROUND OF THE INVENTION

The present invention generally relates to transportation. More particularly, the invention relates to the transportation of people or goods in transit corridors made up of both railway and roadway sections, by means of vehicles that are equipped to operate with equal facility on railway rails and road surfaces, and that are propelled using a traction wheel system. The invention also relates to other conveyances, such as bicycles, which can be propelled using a similar traction wheel system.

The need exists for a transportation system that provides efficient, flexible and ecologically sound carriage of persons and goods between various locations. As an example, people work in cities but live in the suburbs, typically commuting along known routes and at known times, yet no flexible, efficient transportation system exists to fill even this common need. Private vehicles on roadways offer good flexibility in the choice of routes, departure points and destinations, but they are not fuel efficient when compared with other forms of transportation, and their use, en masse, causes traffic jams, environmental problems, and other undesirable consequences.

Railroad vehicles have the advantage of very high fuel efficiency, the result of the low rolling friction between the vehicle's steel wheels and the steel rails, an efficiency that is enhanced by the use of electricity for propulsion. Unfortunately, railroad routes are not flexible, offering few opportunities for route changes or the altering of departure points and destinations. The railway commuter is forced to use some other means of transportation to get to or from the fixed railway system. The usual other means is a motor vehicle, bus, taxi or the commuter's own car, making parking and transfer facilities necessary at access points along the rail line, and reducing the overall efficiency of the rail commute. Another disadvantage of railroad operation is that the low rolling friction between the steel wheels and steel rails is accompanied by limited traction as well, limiting acceleration, braking and grade climbing ability. Such low traction limits railway grades to about 3%, meaning that, to replace a grade crossing with a 15 foot clearance overpass, the railway approach ramps on each side must be 500 feet long. The 3% limit prevents new rail commuter lines from being placed on the medians of existing highways.

Buses, by contrast, offer considerable flexibility, being able to change routes, destinations and departure points according to roadway conditions and changes in ridership. Unfortunately, because the engine and drive train of a bus must produce enough power to counter high tire rolling friction while maintaining highway speeds, most buses are substantially over powered and inefficient for the slower speeds of downtown or suburban routes. Busways give buses a railway type of right of way to avoid highway traffic and delays, but they do not offer the 'low-friction, high-efficiency' railway advantage. Also, busways cannot, generally, make use of highway medians. While vehicles guided by and confined to tracks require a right of way about 10 feet wide, buses require somewhat more width to allow for variations in steering through confined areas.

Bikeways are being promoted in some areas, the bicycle being the most efficient mode of transportation in terms of energy expended per passenger mile. Bicycles could at least reduce the need to use a motor vehicle to get to a railway station or a hybrid vehicle "station stop". If bicycle carrying trains and buses become available, bicycles could also reduce downtown motor vehicle usage as well. Although going to the office on a bicycle may never become popular, any means or mechanism that helps the increasing number of bicycle users "carry home the groceries" or "make it up that hill" is welcomed.

Transportation systems that combine rail and road operation exist in some cities of the world. Generally their rubber road tires simply act against the steel rails to provide traction on the railway sections of a route. Although providing greater traction than steel on steel, rubber on steel does not generate as much traction as rubber on paved surfaces. Therefore, vehicles utilizing rubber wheels on steel rails for traction realize only moderate increases in acceleration, braking and grade climbing ability when compared to conventional railway vehicles.

A number of devices have been devised to apply, or increase the traction needed to propel vehicles on rails and roads. One such device is disclosed in U.S. Pat. No. 1,889,241, to Gibson et al, wherein a roller, when moved into frictional engagement with a vehicle's drive wheel, serves to rotate a traction wheel, the traction wheel having some freedom to follow a road's surface while providing auxiliary, intermittent, traction on rough or icy roads.

SUMMARY OF THE INVENTION

Briefly stated, the invention in one preferred form comprises a hybrid transit system having a transit corridor linking a departure point with a destination using railway sections, roadway sections and junctions therebetween. The hybrid transit system includes a hybrid vehicle that is able to operate on the rails of railway sections and on the pavement of roadway sections using dual mode wheels. The hybrid vehicle is propelled by a traction wheel on both railway and roadway sections of the transit corridor. Railway sections are conventional railway lines which have been modified by the addition of a traction strip of road paving material laid central to the rails to provide a traction surface equal to that of existing roads. Power to the traction wheel is conveyed through a traction wheel system which, while rotating the traction wheel against a traction surface, also acts to generate a normal force between the traction wheel and the traction surface, a force that varies with the traction being produced in a fixed, preset ratio, thus insuring generation of the traction needed to propel the vehicle.

Another preferred form of the invention incorporates the traction wheel system in an auxiliary power unit for a bicycle, the traction wheel acting against the rear wheel of the bicycle to add motive power. This embodiment takes advantage of the traction wheel system generating only enough contact pressure between the traction wheel and the bicycle tire to provide the traction needed, thereby reducing energy wasting tire contact pressure and conserving battery power.

The transit corridor for the hybrid vehicle includes any number of railway sections connected by junctions to any number of roadway sections, affording passengers continuous transit between various departure points and destinations. Old freight lines form important links because trackside room is not needed for stations and parking with the inventive hybrid transit system. Instead, existing grade crossings are converted into junctions, allowing hybrid vehicles to turn onto the roadway section to make a "station stop" and return to the railway section; to continue on the road to a destination; or simply to drive across the crossroad to enter the next railway section of the transit corridor.

Because the traction wheel system gives hybrid vehicles grade climbing ability equal to that of road vehicles, grade crossings that must be eliminated are replaced by overpasses with short approach ramps. Switches that cannot be remove are paved as back-to-back junctions, much like streetcar track switches.

The hybrid vehicle is propelled by a power source, acting through a traction wheel system, to rotate a traction wheel against a traction surface present in both railway and roadway sections of a transit corridor. The traction surface in railway sections is constructed of road paving material preferably laid central to the rails and substantially level with the tires of the dual mode wheels when the flanged sections are on the rails. At junctions, the traction surfaces merge smoothly into the conventional road surface of the roadway section.

The traction wheel system propelling the hybrid vehicle on both rail and road removes traction as a function of the steel wheel/rail interface. The traction wheel system also eliminates the need for differentials, transfer cases or other means to make all wheels "drivers", as is often necessary in rail conventional traction systems to make full use of vehicle weight in the generation of traction between steel wheels and steel rails. The single traction wheel drive provides advantages for roadway operation, such as the elimination of traction as a function of the dual mode wheel tire portion, thereby allowing the use of low rolling friction tires to reduce roadway section propulsion energy needs.

The hybrid vehicle is supported by a plurality of dual mode wheels. Each dual mode wheel comprises a flanged section for cooperation with railroad rails and a tire section for cooperation with road surfaces. Each flanged section is rotatably connected by a solid axle extending transversely across the vehicle to the respective opposing flanged section to permit proper rail operation. Each tire section is mounted for independent rotation about the axle to provide the differential action needed for roadway section operation. However, the tire sections are prevented from rotating faster than their respective flanged section by means of a one-way clutch mounted between the two. The independent rotation of the flanged and tire sections of each dual mode wheel allows the sections to rotate at the different speeds their different rolling surface radii impose and the clutches allow the use of a simple braking system.

At least one pair of dual mode wheels is also mounted for steering. Each steerable wheel is mounted to the vehicle for pivoting about a canted steering axis by means of steering knuckles connected by a steering arm. A universal joint is mounted to the axle adjacent each of the canted axes. The steering knuckles, steering arms and universal joints function to allow steering of the hybrid vehicle on roadway surfaces in a manner well known to front-wheel-drive vehicle construction. During operation of the hybrid vehicle on a railway section of a transit corridor, the steering ability of the dual mode wheel pair can be locked out while the universal joints continue to provide the torsional rigidity needed by the axle for proper rail operation.

Braking of the hybrid vehicle may be accomplished, on both rails and roads, by means of "service" brakes acting on the axles connecting each dual mode wheel pair. Axle mounted discs cooperating with vehicle mounted calipers provide braking action to the flanged sections of the dual mode wheels and, through the one-way clutches, to the tire sections. Additional "service" braking, "emergency" braking and "service" braking during backing of the hybrid vehicle on roadway surfaces, is provided by a disc brake system acting on the traction wheel shaft while a force is applied to the traction wheel system to maintain the traction wheel against the traction surface. Electrically powered vehicles allow regenerative "service" braking, absorbing power at the power output shaft before applying braking effort to the traction wheel shaft.

The traction wheel system employed to propel the hybrid vehicle comprises a gearbox mounted to pivot about a power output shaft or about vehicle structure having an axis coincident with that of the power output shaft. A vehicle power source is connected to transfer power to the power output shaft. The axis of the power output shaft, and thus the pivot axis of the gearbox, is positioned transversely to the hybrid vehicle, preferably near the axis of the rear dual mode wheels. Within the gearbox, a pinion gear is mounted to the power output shaft. A traction wheel gear mounted to a traction wheel shaft is positioned to engage the pinion gear. The traction wheel shaft is rotationally mounted to the gearbox parallel to the power output shaft and extends externally of the gearbox to allow mounting of a traction wheel.

Because the gearbox is free to pivot about the vehicle's power output shaft, a torque applied to the pinion gear to rotate the traction wheel and thereby to generate a traction force to propel the hybrid vehicle, will also generate a reaction force, through the traction wheel gear, traction wheel shaft and traction wheel, at the contact point between the traction wheel and a traction surface. The traction force, a tangential force, and the reaction force, a normal force, will be in a fixed ratio set by traction wheel system parameters such as the distance of the power output shaft from the traction strip or road surface, the gearbox center distance and the traction wheel diameter. The ratio so formed (given by the tangential force divided by the normal force), defines a "traction coefficient". The traction coefficient can be compared with the "friction coefficient" between the traction wheel and a traction surface. If the traction coefficient is smaller than the smallest expected friction coefficient, the traction wheel will not slip when generating traction on the traction surface.

Besides serving as a simple drive train, the traction wheel system provides another benefit. Because the normal force is automatically generated in a fixed ratio to the tangential force, if only a small tangential force is needed to propel the hybrid vehicle, such as on a level railway right of way, the normal force will also be small. The traction wheel system acts to exert only enough normal force between the traction wheel and the traction surface to insure generation of the required traction force. By contrast, most vehicles exert a constant normal force on their traction wheels regardless of traction demands, causing needless tire friction and wear.

A modification of the preferred embodiment eliminates traction strips in the railway sections of transit corridors. Instead of one traction wheel acting against a traction strip, the traction wheel shaft of the traction wheel system is transversely extended across the hybrid vehicle and a traction wheel aligned with a rail is fixed at each end of the shaft. The action of the traction wheel system is unchanged and the modified system is positioned just forward of the rear set of dual mode wheels. The traction wheels act directly against the rails to develop traction. To provide adequate traction given the lower friction coefficient between the rubber wheel and steel rail, the power output shaft position is adjustable in use. During railway travel the power output shaft height is raised to increase the normal force and the traction obtained from the rubber wheel driving against the steel rail. On roadways where the rubber wheel driving against pavement provides a greater friction coefficient, the power output shaft is lowered to eliminate unneeded normal force. The adjustability of the power output shaft position also accommodates the different operating radii of the flanged and tire sections of the dual mode wheels. A differential in the traction wheel shaft aids in roadway maneuvering.

In use, passengers board the hybrid vehicle at any convenient "station stop", perhaps one within walking distance of home or office. Because the noisy, powerful engines conventionally required for high speed roadway travel are not needed, the transit system with its quiet, moderately powered, odor free hybrid vehicles is a neighborhood asset. After making its rounds, the hybrid vehicle is driven on a roadway section to a transit corridor junction. At the transit junction, the hybrid vehicle rolls from the roadway surface onto the rails, the tire sections of the dual mode wheels giving up contact with the road surface as the flanged sections engage the rails. Throughout this transition, the traction wheel provides continuous propulsion as it rolls from paved roadway to traction strip. While on the railway section, the steering ability of the dual mode wheels is locked out to let the flanged sections of the dual mode wheels support and guide the hybrid vehicle in a conventional manner. Upon arrival at the next junction the sequence is reversed, the flanged sections of the dual mode wheels giving up engagement with the rails as the tire sections roll onto the roadway pavement, the traction wheel system again providing continuous traction. Once on the roadway section, operator steering of the hybrid vehicle is resumed and the vehicle is driven to its destination, a station stop or to another transit corridor junction.

The "road-like" acceleration and braking ability of hybrid vehicles on the railway sections of transit corridors eliminates the need for complicated signal and warning systems. There is no need for advance warnings of "red signal ahead" to allow enough stopping distance. Simple "slow" or "caution" signs or signals warning of a "junction ahead", and ordinary traffic lights at junction road crossings, provide the necessary information for operator control, similar to that used on ordinary roadways and highways. The only need for railway type signals is on "single track" railway sections that are used for hybrid vehicle travel in both directions simultaneously.

A preferred arrangement to facilitate proper engagement of the flanged sections of the dual mode wheels with the rails during transitions from roadway to railway at transit corridor junctions, employs an onboard sensor to follow a cable embedded in the roadway for a distance before the railway section. The sensor tracks the cable to provide a directional signal that can be used to direct the hybrid vehicle toward the center of the rails, somewhat like systems proposed for "automatic roads" or used with Automatic Guided Vehicles.

The ability of hybrid vehicles to utilize high traction strips allows railway sections of transit corridors to be added to terrain too difficult for use by ordinary rail vehicles, such as the medians of existing highways. Ramps at overpasses, similar to HOV lane ramps, create corridor junctions and route flexibility. Where there is no highway interchange, a ramp at the overpass creates a transit corridor junction and "station stops" not available to buses using the same highway.

The use of a traction wheel system in a battery powered auxiliary power unit for a bicycle takes advantage of the traction wheel system in a different way. The system's ability to generate only enough contact pressure between the traction wheel and bicycle tire to insure the generation of the necessary traction force extends battery life and operating range. The coefficient of friction between the rubber traction wheel and the rubber bicycle tire is high, so slippage is not typically a problem. However, unnecessarily high tire contact pressure, especially the high, constant contact pressure as supplied by levers or other conventional means to insure adequate contact pressure for hill climbing traction wastes battery power. By contrast, the traction wheel system not only varies tire contact pressure in proportion to required traction, it applies no tire contact pressure when no traction is called for, the traction wheel system pivoting into position to provide traction only when needed.

An object of the invention is to provide a new and improved transportation system capable of carriage of persons and goods.

Another object of the invention is to provide a transportation system which can effectively exploit the efficiency of railway travel while retaining the flexibility in choosing and changing departure and arrival points obtainable from roadway travel.

Yet another object of the invention is to provide a new wheel and axle assembly which is functional for both railway and roadway operation.

A further object of the invention is to provide a new and useful mechanism which can efficiently and effectively produce traction between the rolling surface of a wheel and a surface on which it is rolling.

BRIEF DESCRIPTION OF THE DRAWINGS

Other objects and advantages of the invention will be evident to one of ordinary skill in the art from the following detailed description made with reference to the accompanying drawings, in which.

DESCRIPTION OF THE PREFERRED EMBODIMENTS

Figure 3:
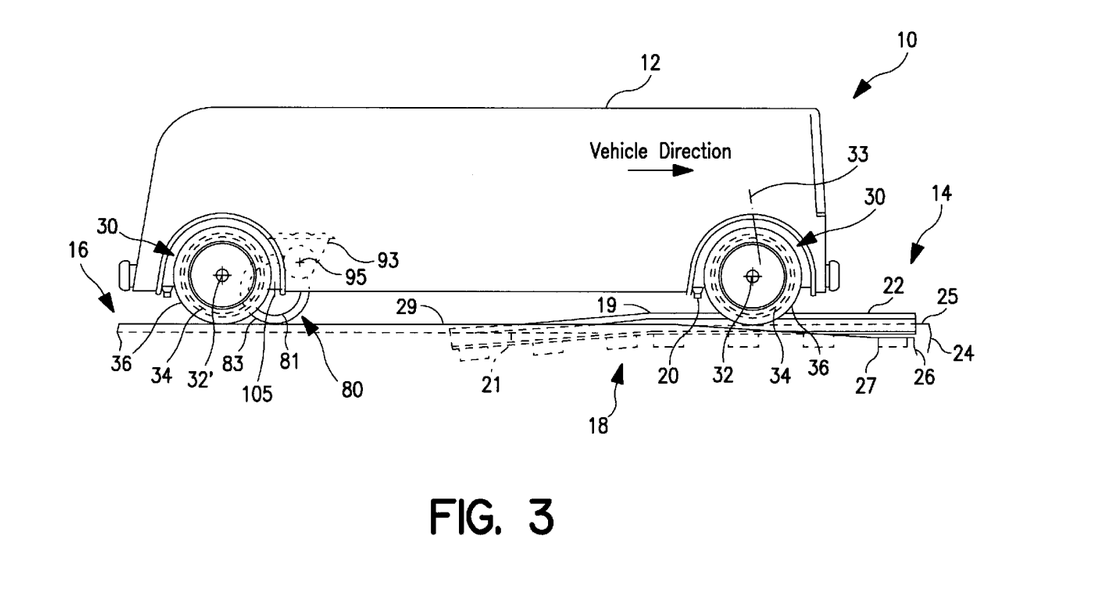
FIG. 3 is a schematic side view, partly in phantom, of a hybrid vehicle with its rear wheels and traction wheel system on a roadway surface and its front wheels on a railway section, and further showing one form of transit corridor junction between the roadway and railway sections.
Figure 4:
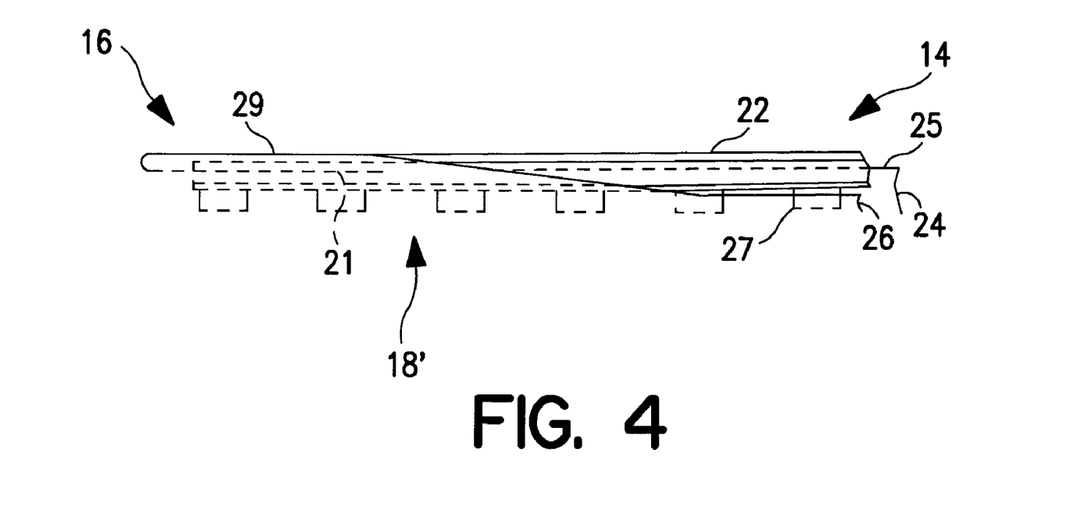
FIG. 4 is a schematic side view, partly in phantom, of an alternate form of corridor junction.

With reference to the drawings wherein like numerals represent like parts, a hybrid transit system 10 is comprised of a transit corridor which links a first location to a second location and a hybrid vehicle 12 which moves within the corridor. As shown in FIGS. 3 and 4, the transit corridor includes railway sections 14, roadway sections 16 and junctions 18, 18' between the railway sections 14 and the roadway sections 16.

Figure 1:
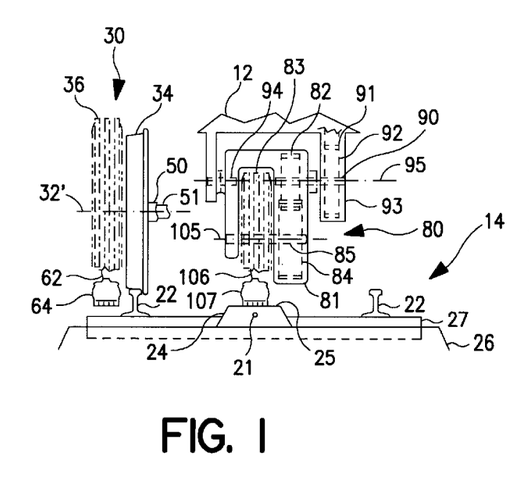
FIG. 1 is a schematic end view, partly in cross section and partly in phantom, showing hybrid vehicle structure in part, a traction wheel and traction wheel system, a dual mode wheel and their relationship to a rail track and a traction strip.

As shown in FIG. 1, each railway section 14 is generally comprised of a pair of spaced rails 22 and a traction strip 24 which parallels the spaced rails 22. The traction strip 24 may be comprised of any common paving material that can provide a railway traction surface 25 generally parallel to the tops of the rails 22. Preferably, the traction strip 24 is located centrally to the rails 22. Both the rails 22 and the traction strip 24 extend essentially continuously for the length of each railway section 14 and are supported by compacted and loose material 26 and rail ties 27 in a manner well known to railroad construction. The railway sections 14 may make use of ordinary railroad rights of way, including existing beds, ties and rails to which a traction strip 24 has been added. The transit corridor may include any number of railway sections 14.

Figure 2:
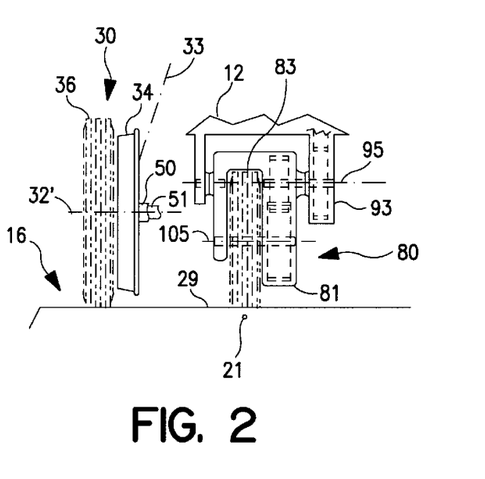
FIG. 2 is a schematic end view showing the elements of FIG. 1 and their relationship to a roadway surface.

As shown in FIG. 2, each roadway section 16 is comprised of common paving material that can provide a road traction surface 29 in a manner well known to road construction. The hybrid vehicle 12 requires no special roadway section surface or preparation and is capable of operation on existing roadways. The transit corridor may include any number of roadway sections 16.

As shown in FIG. 3, the hybrid transit system 10 includes at least one hybrid vehicle 12 adapted for movement within the transit corridor. The hybrid vehicle 12 may be manufactured in conventional and well known ways for the carriage of passengers and goods on rails and roads. The hybrid vehicle is supported and guided by a plurality of dual mode wheels 30 mounted to the hybrid vehicle 12 in cooperating, transversely spaced pairs for rotation about a horizontal axis 32, 32'. One pair is also mounted to the hybrid vehicle 12 for controlled motion about canted vertical axes 33 for steering the hybrid vehicle 12 on the roadway sections 16 of the transit corridor.

As shown in FIGS. 1 and 2, each dual mode wheel 30 comprises a flanged section 34 for engagement with the rails 22 of a railway section 14 and a tire section 36 for operation on the road traction surface 29.

As shown in FIG. 3, in one form of transit corridor junction 18, bends 19 are put in the rails 22 of a railway section 14 and the bent ends are embedded into the surface of the roadway section 16. The road traction surface 29 of the roadway section 16 that is in line with the traction strip 24 is extended to become the traction surface 25 of the traction strip 24. As the rails 22 emerge from the roadway section 16 and engage the flanged sections 34 of the dual mode wheels 30, the road traction surface 29 which is in line with the tire sections 36 of the dual mode wheels 30 slopes down and out of contact with the tire sections 36.

As shown in FIG. 4, in an alternate form of junction 18', the ends of the rails 22 are embedded parallel with the road traction surface 29. The flanged sections 34 of the dual mode wheels 30 engage the rails 22 when the road traction surface 29, which is in line with the tire sections 36 of the dual mode wheels 30, slopes down and out of contact with the tire sections 36. The road traction surface 29 of the roadway section 16 that is in line with the traction strip 24 also slopes down to the level of the traction surface 25 of the traction strip 24. The junction 18, shown in FIG. 3, provides constant level transition from roadway sections 16 to railway sections 14 and vice versa, while the junction 18', shown in FIG. 4, is simpler to construct.

During transitions from roadway sections 16 to railway sections 14 of the transit corridor, the hybrid vehicle 12 may be guided toward proper engagement of the flanged sections 34 with the rails 22 by an onboard sensor 20 which monitors the position of the vehicle 12 with respect to a buried cable 21. The sensor creates a signal indicating offset of the flanged sections 34 from the rails 22 which can be utilized to manually or automatically guide the wheels into alignment with the rails. The cable 21 is embedded linearly in the roadway section 16 before the junction 18, 18' a distance sufficient to insure proper engagement of the flanged sections 34 of the rear dual mode wheels 30 with the rails 22 of the railway section 14, and extends into the traction strip 24 a distance sufficient to insure proper engagement of the flanged sections 34 of the front dual mode wheels 30 with the rails 22. The steerability of the front dual mode wheels 30 is disabled as flanged sections 34 of the front dual mode wheels engage the rails 22 and is restored as these flanged sections disengage the rails 22 at the next junction. Other aids and guides (not shown) such as curbs, painted lines and guide rails can also be used.

As shown in FIGS. 1 and 2, each of the dual mode wheels 30 includes a flanged section 34 and a tire section 36. Each flanged section 34 cooperates with a rail 22 of the railway section 14 to support and guide the hybrid vehicle 12 in a well known manner. The tire section 36 includes a rim wheel 62 and a tire 64 preferably made and mounted in a conventional way. The tire section 36 cooperates with the road traction surface 29 to support the hybrid vehicle 12 on roadway sections 16. Preferably, the flanged sections 34 and tire sections 36 of dual mode wheels 30 are mounted for independent rotation about the horizontal wheel axes 32, 32' to accommodate the different rotation rates imposed by their different contact surface radii during transitions from roadway sections 16 to railway sections 14 and vice versa. The independent rotation of the tire sections 36 also provides the differential action needed for proper operation of the hybrid vehicle 12 on the roadway sections 16 of a transit corridor.

Figure 6:
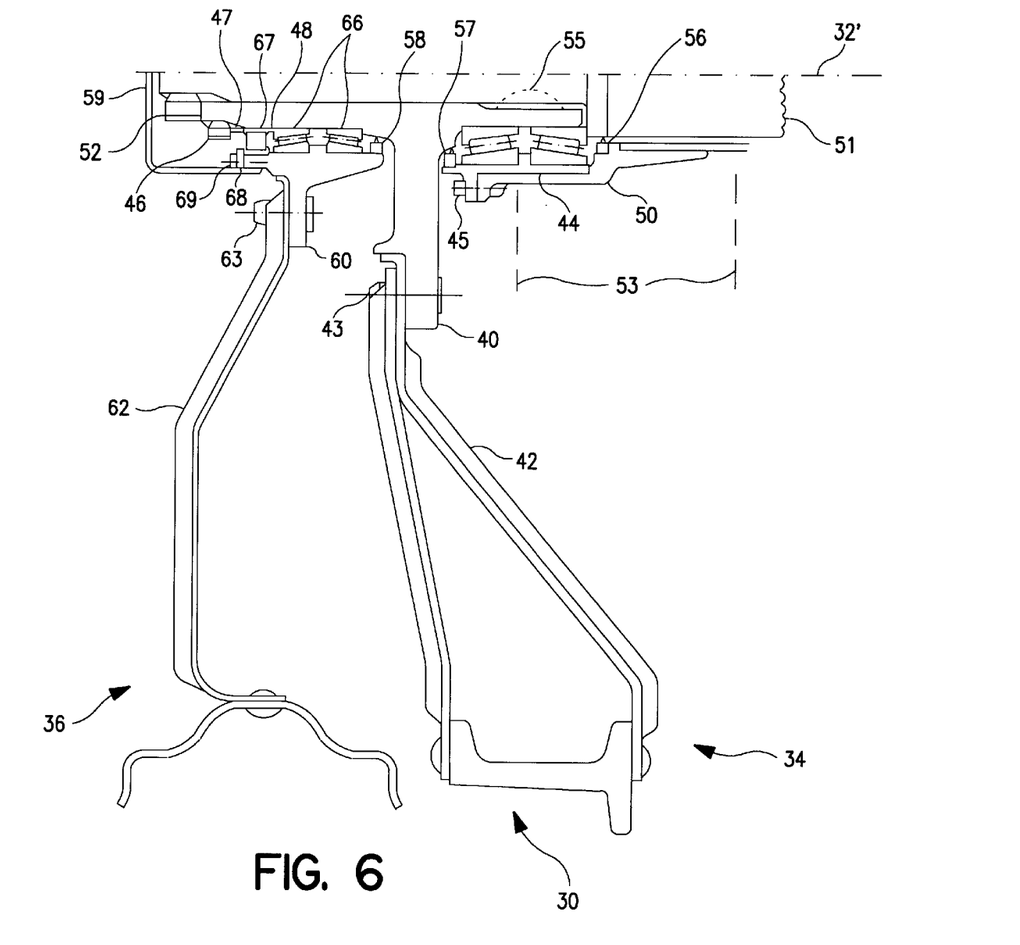
FIG. 6 is a schematic end view in cross section and partly broken away showing one-half of an embodiment of a dual mode wheel and portion of the adjacent vehicle structure.

One embodiment of a dual mode wheel 30 is partially shown in FIG. 6. The flanged section 34 is comprised of a flanged section hub 40 and a flanged wheel 42 removably mounted to the flanged section hub 40 by a plurality of bolts 43. The flanged section hub 40 is rotatably mounted to the axle housing 50 by means of the first bearing unit 44. The first bearing unit is removably mounted to the axle housing 50 by a plurality of bolts 45.

The tire section 36 is comprised of a tire section hub 60 and a rim wheel 62 removably mounted to the tire section hub 60 by a plurality of bolts 63. The tire 64 (see FIG. 1) is mounted to the rim wheel 62 in a conventional fashion. The tire section hub 60 is rotatably mounted to the flanged section hub 40 by a second bearing unit 66. Also, mounted between the tire section hub 60 and the flanged section hub 40 is a one-way clutch 67. The one-way clutch 67 functions to prevent the tire section hub 60 from rotating faster, or "overrunning" the flanged section hub 40 when the hybrid vehicle 12 is moving in a forward direction. The outer race of the one-way clutch 67 may be restrained within the tire section hub 60 by, for example, a lock plate 68 secured by screws 69. A wheel nut 46 is threadably engaged with the flanged section hub 40 and exerts a force through the inner race of the one-way clutch 67 and two spacers 47,48, to preload the second bearing unit 66 against a shoulder on the flanged section hub 40. The axle 51 is rotationally fixed to the flanged section hub 40 by means of a shaft key 55. An axle nut 52 is threadably engaged to the end of the axle 51 and exerts a force to preload the first bearing unit 44 against a shoulder on the axle 51. The shaft seals 56,57 protect the first bearing unit 44, and the seal 58 and the wheel cap 59 protect the second bearing unit 66, from dirt and water. The dual mode wheel 30 is manufactured of any material with sufficient strength to withstand the application, such as, for example, steel.

Each dual mode wheel 30, is connected to and supports the hybrid vehicle 12 by means of structure (not shown) in the area indicated in FIG. 6 by the phantom lines 53, such structure providing springing, damping and other actions well known to vehicle construction. The axle 51 extends transversely across the hybrid vehicle 12 to connect to and cooperate with an opposing dual mode wheel (not shown in FIG. 6).

The cooperation of the axle 51 and opposing dual mode wheels 30 places opposing flanged sections 34 in fixed rotational relationship and enables them to operate properly on the rails 22 of the railway sections 14.

Again with reference to FIG. 6, the one-way clutch 67 allows the flanged section 34 of the dual mode wheel 30 to turn faster than the tire section 36 during transitions from a railway section 14 to a roadway section 16 and allows the tire section 36 to turn more slowly than the flanged section 34 during transitions from a roadway section 16 to a railway section 14. The one-way clutch 67 also allows the tire section 36 of opposing dual mode wheels 30 to rotate independently on the roadway sections 16, thus providing the differential action needed for the hybrid vehicle 12 to properly traverse curves and turns in the roadway sections 16.

The hybrid vehicle may be self-powered, receive electrical power from an external source such as from a catenary system in railway sections 14, or be powered by a combination of the two. As shown in FIG. 1, the power source (not shown) mounted to the hybrid vehicle 12 operates to rotate a power output shaft 90, by means of, for example, intermeshing gears 91, 92. The power output shaft 90 is rotationally mounted to a power shaft housing 93, which in turn is structurally mounted to the hybrid vehicle 12. The rotational axis of the power output shaft 90 is positioned to form a horizontal, transverse axis 95. A stub shaft 94 is mounted to the power shaft housing 93, and positioned along the transverse axis 95.

Figure 5:
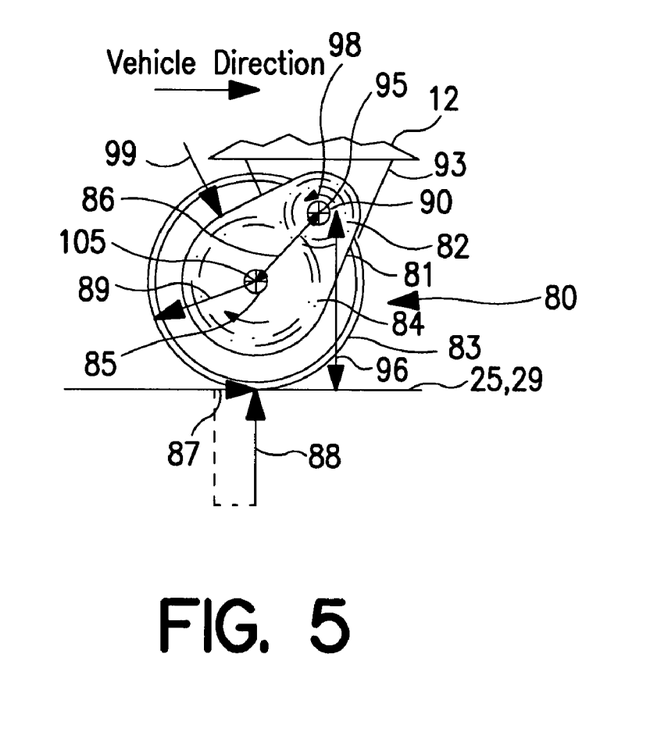
FIG. 5 is a schematic side view, partly in cross section, showing the traction wheel system in greater detail.

As shown in FIGS. 1 and 5, the traction wheel system 80 comprises a gearbox 81 mounted to pivot about the power output shaft 90 and the stub shaft 94. Alternatively, the gearbox 81 may be pivotally mounted to structure (not shown) that is part of the power shaft housing 93 and has the same transverse axis 95 as the power output shaft 90. In some configurations, the power output shaft 90 may clear the traction wheel 83 and be extended to eliminate the stub shaft 94. Within the gearbox 81, a pinion gear 82 is mounted to, and rotated by, the power output shaft 90. The pinion gear 82 engages and rotates a traction wheel gear 84, mounted to a traction wheel shaft 85. The traction wheel shaft 85, defining a traction axis 105, is mounted for rotation in the gearbox 81, parallel to the power output shaft 90, and at the required center distance 86 for proper engagement and operation of the pinion gear 82 and the traction wheel gear 84. The traction wheel shaft 85 extends through the wall of the gearbox 81 for mounting of the traction wheel 83. The traction wheel 83 comprises a hub (not shown), a traction tire rim 106 and a traction tire 107 conventionally mounted to the traction tire rim 106. It is to be noted that all forces acting on the traction wheel 83 are applied to and from the hybrid vehicle 12 through the pivotable mounting of the gearbox 81 to the power output shaft 90, or similar pivotal structure.

With reference to FIG. 5, to propel the hybrid vehicle 12, a torque 98 is applied to the power output shaft 90 by the power source (not shown) of the hybrid vehicle 12. The torque causes rotation of the pinion gear 82 and, by gear engagement, rotation of the traction wheel gear 84, the traction wheel shaft 85 and the traction wheel 83. The traction wheel 83 propels the hybrid vehicle 12 by generating a tangential force 87 against the railway traction surface 25 or the road traction surface 29, the value of the tangential force 87 being set by the value of the torque 98 applied to the power output shaft 90, the gear ratio of the gearbox 81, and the radius 89 of the traction wheel 83. However, because of the pivotal mounting of the gearbox 81, the torque 98 applied to the power output shaft 90 cannot generate the tangential force 87 until there exists a reaction to the torque 98. That reaction is the normal force 88 generated at the contact point between the traction wheel 83 and the traction surface 25 or 29. The ratio of the tangential force 87 to the normal force 88 has a fixed value set by the radius 89 of the traction wheel 83, the center distance 86 of the gearbox 81 and the distance 96 of the transverse axis 95 of the power output shaft 90 from the traction surface 25 or 29. As the height 96 of the axis 95 is increased, the ratio of the tangential force 87 to the normal force 88 becomes smaller. The product of the normal force 88 and the coefficient of friction (not shown) between the traction wheel 83 and the traction surfaces 25, 29 defines the traction force that can be generated by the traction wheel 83 acting against the traction surfaces 25, 29. If the maximum value of traction force that can be produced is greater than the value of tangential force 87 that is actually being produced by the traction wheel system 80, the traction wheel 83 will propel the hybrid vehicle 12 without slippage.

Figure 7:
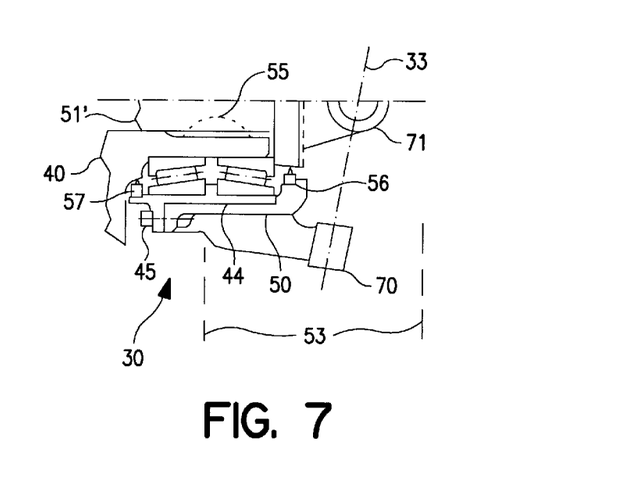
FIG. 7 is a partial schematic end view, partly in cross section and broken away, showing one embodiment of a steerable dual mode wheel.

One embodiment of a steerable dual mode wheel 30 is shown in FIG. 7. On each side of the hybrid vehicle 12, a dual mode wheel 30 is connected to and supports its portion of the hybrid vehicle 12, in the area indicated by the phantom lines 53, by engagement with a steering knuckle 70 (one part being shown in FIG. 7). The steering knuckle is located at, and defines, a canted vertical axis 33 (also shown in FIG. 3). On each side of the hybrid vehicle 12, an axle 51' is segmented in the area of the phantom lines 53 and a universal joint 71, partially shown in FIG. 7, is incorporated into the axle 51' adjacent the canted vertical axis 33. The steering knuckle 70 functions to permit controlled movement of the dual mode wheels 30 about the canted vertical axes 33. The universal joints 71 function to allow the axle 51' to flex about respective canted vertical axes 33 while retaining rotational cooperation of the opposing flanged wheels. Both of these actions are well known in the construction of conventional front wheel drive vehicles. During operation of a hybrid vehicle 12 on a railway section 14 of a transit corridor, the steerability of the dual mode wheels 30 is disabled to render the axle 51' and respective flanged sections 34 equivalent to an axle and wheels of a conventional railroad vehicle.

Long versions of hybrid vehicles 12 that are called upon to follow sharp curves on railway sections 14 of a transit corridor, are preferably fitted with known mechanisms (not shown) to allow articulation between the mounting of the axles 51, 51' and the hybrid vehicle 12. Allowing the axle mounting to articulate minimizes scuffing between the flanged sections 34 and the rails 22 of the railway sections 14. The articulation may be disabled during operation of the hybrid vehicle 12 on the roadway sections 16.

Figures 8, 9:
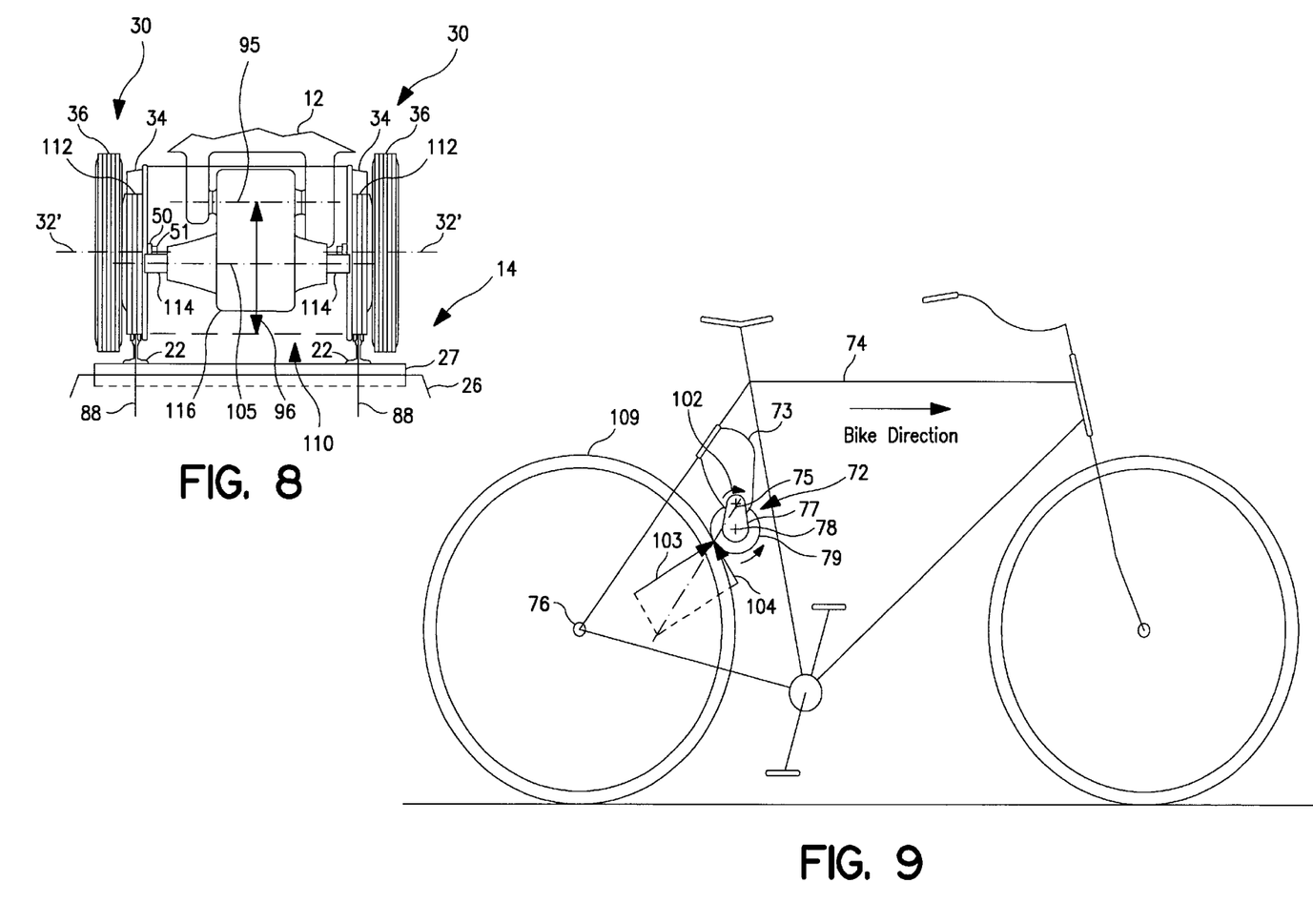
FIG. 8 is a schematic end view, partly broken away, showing hybrid vehicle structure in part, a dual mode wheel, a double traction wheel modified traction wheel system and their relationship to a rail track.
FIG. 9 is a schematic side view of a bicycle incorporating a traction wheel and traction wheel system.

FIG. 8 shows another embodiment in which a hybrid vehicle 12 is propelled by a dual traction wheel system 110. The dual traction wheel system utilizes dual traction wheels 112, acting against the rails 22 in railway sections 14 and against the road surface 29 in roadway sections 16 to generate traction. The mounting and action of the dual wheel traction wheel system 110 is the same as that of the single wheel traction wheel system 80 shown in FIGS. 1 and 5. A traction wheel shaft 114 is transversely extended across the hybrid vehicle 12 for affixing the traction wheels 112 in line with the rails 22 of railway sections 14 and a differential (not shown) is incorporated to accommodate the speed differences imposed on the traction wheels 112 by road maneuvering and rail curves. Preferably, the dual wheel traction wheel system 110 is mounted in the general vicinity of the rear dual mode wheels 30 of the hybrid vehicle 12. Because the coefficient of friction between rubber and steel is usually less than between rubber and most road surfaces, a mechanism (not shown) that increases the height 96 of the transverse axis 95 when the hybrid vehicle is on railway sections 14 of transit corridors, will increase the normal force 88 and maximize the traction obtainable from the prevailing friction conditions.

Although various braking mechanisms and systems well known to vehicle design can be used, a preferred arrangement applies braking effort by means of a disc or drum brake system (not shown). Preferably the calipers are mounted to vehicle 12 structure for engagement with respective disks mounted to each axle 51, 51' to produce braking effort at each of the rotationally fixed flanged sections 34, and through the one-way clutches 67 to the tire sections 36. Additional braking effort is obtained by means of a conventional disc or drum brake system (not shown) mounted to the traction wheel shaft 114 to apply braking effort to the traction wheel shaft 114 and thereby to the traction wheel 112, while an actuator (not shown) exerts a force 99 (shown schematically in FIG. 5) on the gearbox 81 (or dual wheel gearbox 116) of the traction wheel system 80, 110 thereby urging the traction wheel 83, 112 against the traction surfaces 25 and 29. Such braking action obtained from the traction wheel 112, also provides braking when the hybrid vehicle 12 is moving in the reverse direction on the roadway sections 16 of a transit corridor.

FIG. 9 shows the traction wheel system 72 incorporated into an auxiliary power unit 73 for a bicycle 74. In a preferred embodiment, a battery powered electric motor (not shown) applies a torque 102 to rotate a power output shaft 75 positioned parallel to the rear axle 76 of the bicycle 74. The gearbox 77 is pivotally mounted to the power output shaft 75. Within the gearbox 77, a pinion gear (not shown) is rotationally fixed to the power output shaft 75 to engage and rotate a traction wheel gear (not shown) rotationally fixed to the traction wheel shaft 78. The traction wheel shaft 78 is rotationally mounted to the gearbox 77 parallel to the power output shaft 75, and extends through the wall of the gearbox 77 for mounting of the traction wheel 79. When no auxiliary power is being called for, the traction wheel 79 may be out of contact with the rear wheel tire 109 of the bicycle 74. When auxiliary power is called for, the torque 102 applied to the power output shaft 75 will, because of the mechanical friction and rotational inertia of the gears and the traction wheel 79, first pivot the gearbox 77 about the power output shaft 75 until the traction wheel 79 contacts the rear wheel tire 109, and will then rotate the traction wheel 79, to thereby generate the normal force 103 at the point of contact between the traction wheel 79 and the rear wheel tire 109, and the tangential force 104 to rotate the rear wheel tire 109 to help propel the bicycle 74. It is to be noted that all forces acting on the traction wheel 79 are transmitted to and from the bicycle 74 through the pivotable mounting of the gearbox 77 to the power output shaft 75.

While the preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed:

1. A hybrid transit system comprising:

a transit corridor including,
    a railway section comprising an upwardly facing traction surface and a pair of spaced rails,
    a roadway section comprising a paved roadway, and
    a junction between said railway section and said roadway sections; and a hybrid vehicle for movement within said transit corridor, including:
    a plurality of dual-mode wheels mounted to said hybrid vehicle for rotation about a first axis, each said dual-mode wheel having a flanged section for cooperation with a said rail and a tire section for cooperation with said paved roadway, at least two of said dual-mode wheels also mounted for simultaneous pivoting about a second axis and said first axis, and
    propulsion means for propelling said hybrid vehicle; wherein said hybrid vehicle is supported and guided within said railway section substantially by the cooperation of said plurality of flanged sections and said rails, and said hybrid vehicle is supported and guided within said roadway section substantially by the cooperation of said tire section and said roadway and said hybrid vehicle is supported and guided within said junction substantially by the cooperation of at least one of said flanged section with said rail or said tire section with said roadway.

2. The hybrid transit system of claim 1, wherein said traction surface comprises a traction strip intermediate said rails.

3. The hybrid transit system of claim 1, wherein said railway section consists essentially of a pair of spaced, upwardly facing rails and a traction strip located intermediate said rails, said traction strip consisting essentially of a paving material.

4. The hybrid transit system of claim 1, wherein said rails comprise said traction surface and said propulsion means comprises a dual traction wheel system having a spaced pair of traction wheels pivotably mounted to said hybrid vehicle independently of said dual-mode wheels for rotation by a power source, each said traction wheel engageable with one said rail to propel said hybrid vehicle within said railway section and both said traction wheels engageable with said paved roadway to propel said hybrid vehicle within said roadway section.

5. The hybrid transit system of claim 1, wherein said flanged section and said tire section rotate about said first axis independently of one another.

6. The hybrid transit system of claim 1, wherein said plurality of dual-mode wheels is arranged in spaced pairs, said flanged sections in a respective spaced pair being rotationally fixed and said tire sections in each respective spaced pair being rotationally independent.

7. The hybrid transit system of claim 1, wherein said plurality of dual-mode wheels is arranged in spaced pairs, said flanged sections in a respective spaced pair being rotationally joined in said first axis by an axle and said tire sections in each respective spaced pair being rotationally independent in said first axis.

8. The hybrid transit system of claim 1, wherein said tire section of at least one said dual-mode wheel is rotationally fixed to said flanged section in a first rotational direction and rotationally independent of said flanged section in a second rotational direction.

9. The hybrid transit system of claim 1, wherein said junction comprises at least one of:
    an inclined portion connecting each said rail and said paved roadway; and
    an inclined portion connecting said traction strip and said paved roadway.

10. The hybrid transit system of claim 1, wherein the dual-mode wheels are non-powered.

11. A hybrid transit system comprising:
    a transit corridor including,
        a railway section comprising an upwardly facing traction surface and a pair of spaced rails,
        a roadway section comprising a paved roadway, and
        a junction between said railway section and said roadway sections; and
    a hybrid vehicle for movement within said transit corridor, including:
        a plurality of dual-mode wheels mounted to said hybrid vehicle for rotation about a first axis, each said dual-mode wheel having a flanged section for cooperation with a said rail and a tire section for cooperation with said paved roadway, at least two of said dual-mode wheels also mounted for simultaneous pivoting about a second axis and said first axis, and
        propulsion means for propelling said hybrid vehicle comprising a traction wheel pivotably mounted to said hybrid vehicle independently of said dual-mode wheels for powered rotation about an axis, said traction wheel engageable with said traction surface to propel said hybrid vehicle within said railway section and engageable with said paved roadway to propel said hybrid vehicle within said roadway section.

12. The hybrid transit system of claim 11, wherein said traction wheel is engageable with either said traction surface or said paved roadway to generate a tangential force and a normal force, said tangential and normal forces having a fixed ratio.

13. A hybrid vehicle for use on both a railway and a roadway, comprising:
    a chassis;
    a plurality of dual-mode wheels mounted to said chassis in spaced pairs, each spaced pair rotatable about a respective first axis, each said dual-mode wheel having a flanged section and a tire section, at least two of said dual-mode wheels also mounted for simultaneous movement about both a second axis and said first axis, wherein each said flanged section and respective said tire section rotate about said respective first axis independently of one another in a first rotational direction and dependently in a second rotational direction; and
    a propulsion system for moving said vehicle, wherein said hybrid vehicle is supported on said railway substantially by the plurality of wheel flanged sections each cooperating with a rail and said hybrid vehicle is supported on said roadway substantially by the plurality of tire sections cooperating with said roadway.

14. A hybrid vehicle for use on both a railway and a roadway, comprising:
    a chassis;
    a plurality of dual-mode wheels mounted to said chassis in spaced pairs, each spaced pair rotatable about a respective first axis, each said dual-mode wheel having a flanged section and a tire section, at least two of said dual-mode wheels also mounted for simultaneous movement about both a second axis and said first axis wherein the dual-mode wheels are non-powered; and
    a propulsion system for moving said vehicle; wherein said hybrid vehicle is supported on said railway substantially by the plurality of wheel flanged sections each cooperating with a rail and said hybrid vehicle is supported on said roadway substantially by the plurality of tire sections cooperating with said roadway.

15. A vehicle, comprising:
    a chassis;
    a plurality of wheels mounted to said chassis in spaced pairs, each spaced pair rotatable about a respective first axis, at least two of said wheels also mounted for simultaneous movement about both a second axis and said first axis; and
    a propulsion system for moving said vehicle comprising a traction wheel system having a traction wheel pivotably mounted to said vehicle independently of said wheels for powered rotation about an axis, said traction wheel engageable with an upwardly facing traction surface to generate a tangential force and a normal force, said tangential and normal forces having a fixed ratio.

16. A hybrid transport method, comprising:
    defining a departure location and an arrival location;
    providing a transit corridor linking said departure and arrival locations, said transit corridor having a railway section comprising an upwardly facing traction strip and a pair of spaced rails and a roadway section comprising a paved roadway;
    providing a hybrid vehicle at said departure location, said hybrid vehicle including:
        a plurality of non-powered dual-mode wheels mounted to said hybrid vehicle in spaced pairs, each spaced pair rotatable about a respective first axis, each said dual-mode wheel having a flanged section for cooperation with a said rail and a tire section for cooperation with said paved roadway, at least two of said dual-mode wheels also mounted for simultaneous rotation about said respective first axis and pivotal movement about a second axis, and
        a traction wheel pivotably mounted to said hybrid vehicle independently of said dual-mode wheels for powered rotation about an axis, said traction wheel cooperating with said traction strip to propel said hybrid vehicle within said railway section and said paved roadway to propel said hybrid vehicle within said roadway section;

loading said hybrid vehicle;

driving said hybrid vehicle along said transit corridor from said departure location to said arrival location; and unloading said hybrid vehicle.

17. A traction wheel system comprising:

a friction surface;

a power source having a rotational axis; and a traction wheel connected through a transmission to the power source, the transmission pivotally mounted by a transmission mount about said rotational axis for engagement of the traction wheel with said friction surface, wherein said engagement generates a tangential force and a normal force, said tangential and normal forces having a fixed ratio and transmitted only through the transmission to the transmission mount.

18. The traction wheel system of claim 17 wherein the traction wheel is disposed between the power source and the friction surface during engagement with the friction surface.

19. The traction wheel system of claim 17 wherein the power source rotates in a first direction and the traction wheel rotates in a direction opposite to the first direction.

20. The traction wheel system of claim 17 wherein said normal force is substantially dependent on torque supplied by said power source.

21. The traction wheel system of claim 17 wherein a wheel defines the friction surface.

* * * * *